US006244650B1

(12) United States Patent
Namvari

(10) Patent No.: US 6,244,650 B1
(45) Date of Patent: Jun. 12, 2001

(54) SUPPORT FOR THE BONNET OF A MOTOR VEHICLE

(75) Inventor: Shahab Namvari, Kennington (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/367,391

(22) PCT Filed: Feb. 9, 1998

(86) PCT No.: PCT/GB98/00393

§ 371 Date: Aug. 12, 1999

§ 102(e) Date: Aug. 12, 1999

(87) PCT Pub. No.: WO98/37296

PCT Pub. Date: Aug. 27, 1998

(30) Foreign Application Priority Data

Feb. 20, 1997 (GB) .................................................. 9703533

(51) Int. Cl.[7] .................................................... B62D 25/12

(52) U.S. Cl. .......................... 296/76; 292/338; 180/69.21

(58) Field of Search .............................. 292/338; 296/76; 180/69.21

(56) References Cited

U.S. PATENT DOCUMENTS

| | | | | |
|---|---|---|---|---|
| 2,434,598 | * | 1/1948 | Stegall . | |
| 4,062,583 | * | 12/1977 | Taylor | 296/76 |
| 4,278,280 | * | 7/1981 | Rashbaum | 292/263 |
| 4,586,579 | * | 5/1986 | Matsui et al. | 180/69.21 |
| 4,588,220 | * | 5/1986 | Matsui et al. | 292/338 |

FOREIGN PATENT DOCUMENTS

| | | |
|---|---|---|
| 0 101 957 | 7/1983 | (EP) . |
| 0 107 812 | 10/1983 | (EP) . |
| 0 107 813 | 10/1983 | (EP) . |
| 2 544 034 | 4/1983 | (FR) . |
| 1 546 343 | 3/1976 | (GB) . |
| 2 229 222 | 9/1990 | (GB) . |

* cited by examiner

*Primary Examiner*—D. Glenn Dayoan
*Assistant Examiner*—Jason Morrow
(74) *Attorney, Agent, or Firm*—Davis & Bujold, P.L.L.C.

(57) ABSTRACT

A support (10) for the bonnet (6) of a motor vehicle (5) in which a plastic hinge member (11) is snap fitted into an elongate aperture (21, 22) in a structural member (20) of the motor vehicle (5). The invention therefore provides a simple and quick to fit support for the bonnet of a motor vehicle.

18 Claims, 4 Drawing Sheets

SUPPORT FOR THE BONNET OF A MOTOR VEHICLE

This invention relates to motor vehicles and in particular to a support stay for the engine cover, bonnet or hood of a vehicle to hold the bonnet in an open position.

It is know from DE-A-4005370 to provide a support stay for the bonnet of a motor vehicle made of rod material with one end forming a hinge so that the stay can be folded from a stored position in which it lies substantially transversely with respect to the vehicle to an erect position in which it engages with a recess in the bonnet to support the bonnet in an open position. It is further known from FR-A-2544034 to provide a means for attaching such a stay to the body structure of the motor vehicle.

It is an object of this invention to provide an improved support for the bonnet of a motor vehicle.

According to the invention there is provided a motor vehicle having a body including a front cross-member and an engine cover that is pivotable between a closed position and an open position and a support for the cover comprising of an elongate rod having a base end engaged with the front cross-member of the motor vehicle and a top end for engagement with the cover when the support is in a supporting position wherein the base end has a plastic hinge member engaged with an aperture formed in a top surface of the cross-member of the motor vehicle to allow the support to be folded from a stored position to the cover supporting position.

The top surface of the cross-member may be a horizontal surface.

The plastic hinge member may have a pivot surface for abutment against one edge of the aperture and may have a curved guide surface for abutment with an opposite edge of the aperture.

The radial distance between the pivot surface and the guide surface may be slightly less than the distance between the opposite edges of the aperture.

The plastic hinge member may have a stop formed at one end of the curved guide surface to limit rotation of the plastic hinge member in one direction.

There may be a recess between the end of the curved guide portion and the stop such that the radial distance between the surface of the recess and the pivot surface is considerably less than the distance between the opposite edges of the aperture.

There may be a lug formed on the surface of the plastic hinge member adjacent the pivot surface.

The distance from the top surface of the lug to the surface of the recess is greater than the distance between the opposite edges of the aperture such that the plastic hinge member has to be snap-fitted into the aperture.

The invention will now be described by way of example with reference to the accompanying drawing of which:

Figure 1:
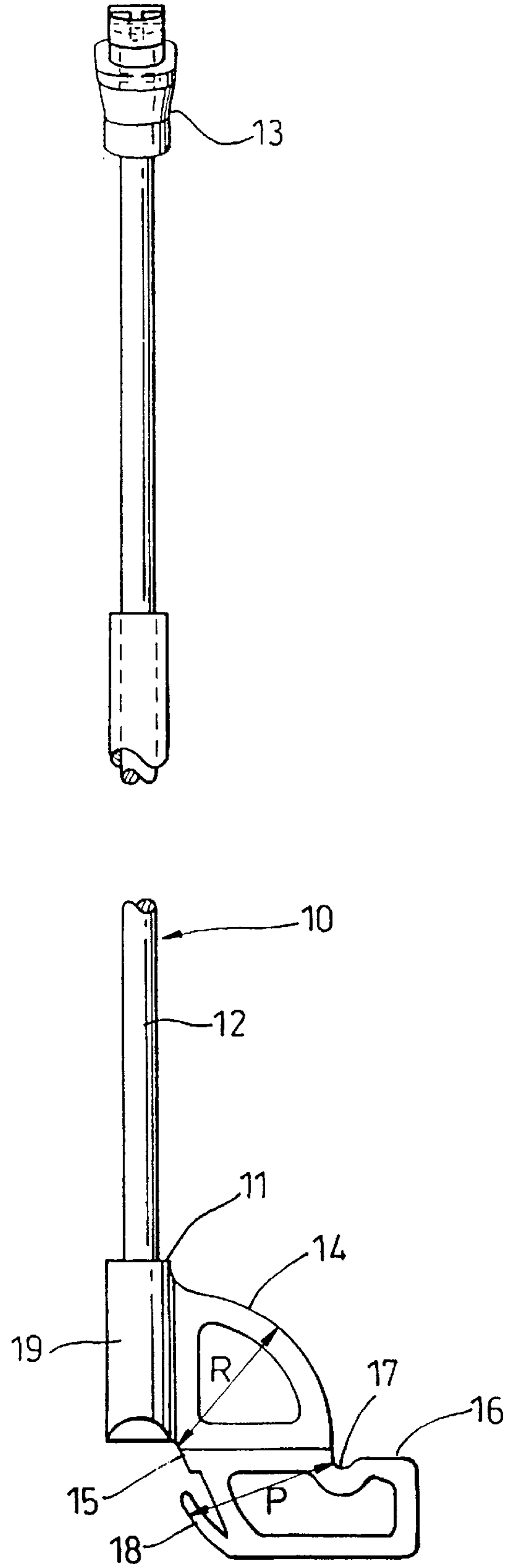
FIG. 1 is a plan view of a support for an engine cover of a motor vehicle according to the invention.
Figure 2:
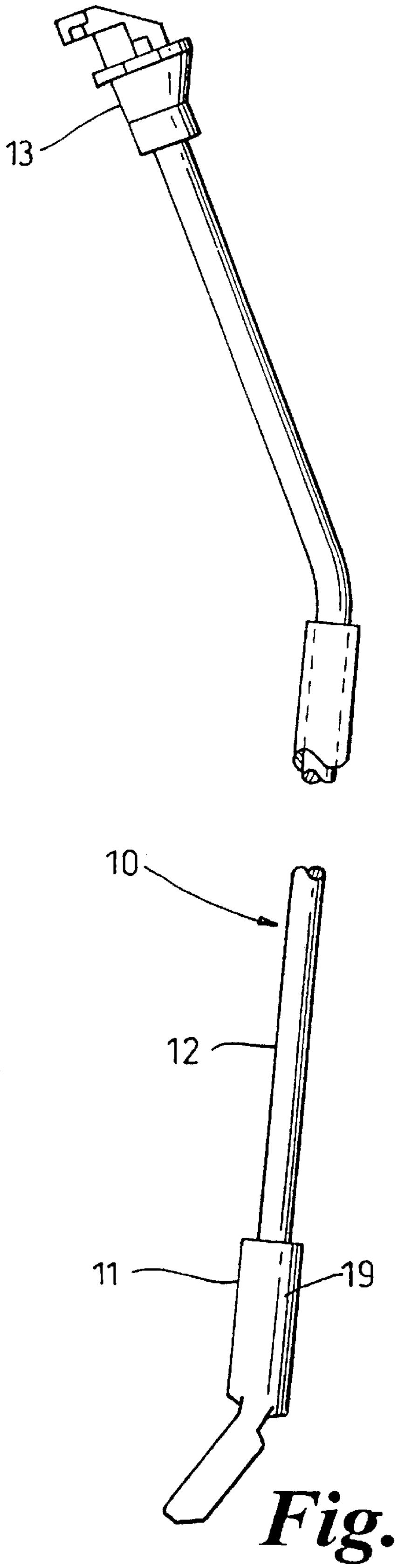
FIG. 2 is a side view of a support for an engine cover of a motor vehicle according to the invention.

With reference to the figures there is shown a motor vehicle 5 having a body structure 7 including an engine cover or bonnet 6 that is pivotable between a closed position in which it closes off the upper opening to an engine compartment 9 and an open position in which access is provided to an engine 8 mounted within the engine compartment 9.

Figure 7:
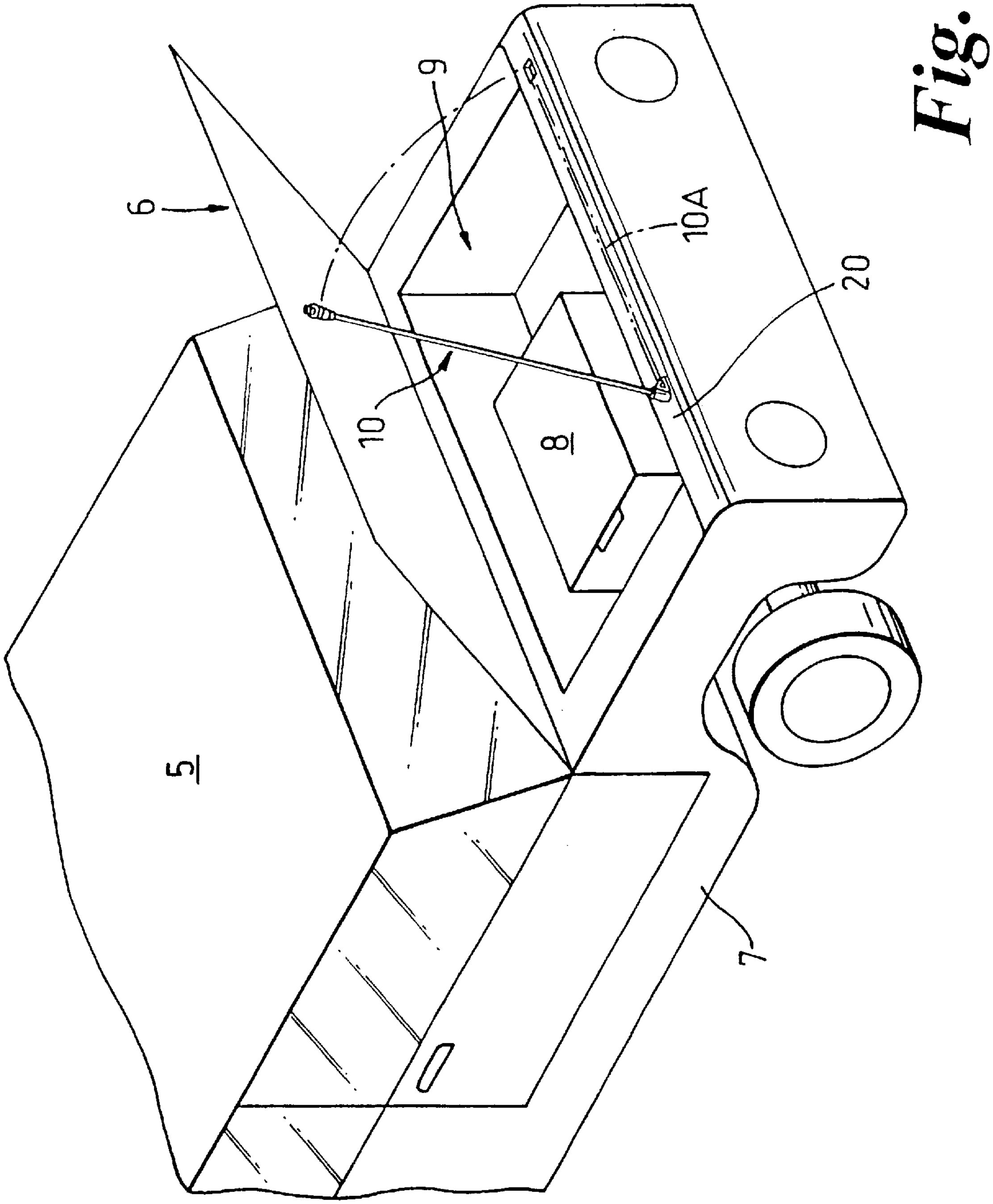
FIG. 7 is a pictorial representation of the front part of a motor vehicle showing a support for a bonnet in an in use and stored positions.

A support 10 for the bonnet is pivotally connected to a transverse cross-member 20 forming part of the body structure of the motor vehicle to allow the support to be folded from a stored position in which it lies substantially transversely respect to the motor vehicle 5 (as shown by reference numeral 10A on FIG. 7) to an erect position (as shown by reference numeral 10 on FIG. 7) in which its upper end engages with a recess in the bonnet 6 to support the bonnet in said open position.

The support comprises of an elongate metal rod 12 having a plastic hinge member 11 molded onto a base end thereof and a top end fixing 13 molded onto the top end thereof for engagement with an aperture in the bonnet 6 when the support 10 is in a bonnet supporting position.

The plastic hinge member 11 has a tubular body portion 19 molded onto the rod 12 and a flange portion extending therefrom defining a pivot surface 15 for abutment against one edge 22 of an aperture in the structural member 20 and a curved guide surface 14 for abutment with an opposite edge 21 of the aperture in the structural member 20. A flange 16 extends away from the outer end of the curved guide surface 14 to provide stop limiting rotation of the plastic hinge member 11 in one direction. A recess 17 is formed at the juncture of the curved guide surface 14 and the stop 16 and on the opposite side of the stop 16 there is formed an outwardly extending lug 18.

The radial distance 'R' between the pivot surface 15 and the curved guide surface 14 is slightly less than the distance between the opposite ends 21, 22 of the aperture in the structural member 20. Therefore upon engagement of the plastic hinge member 11 with the aperture in the structural member 20 the pivot surface 15 and the curved guide surface 14 combine with the inner edges 21, 22 of the aperture to produce a hinged connection between the support 10 and the body 7 of the motor vehicle.

The distance 'P' between the surface of the recess 17 and the outer edge of the lug 18 is greater than the distance between the opposite edges 21, 22 of the aperture in the structural member 20. Therefore once the plastic hinge member 11 has been inserted into the aperture in the structural member 20 it is retained therein by the presence of the lug 18.

Figure 3:
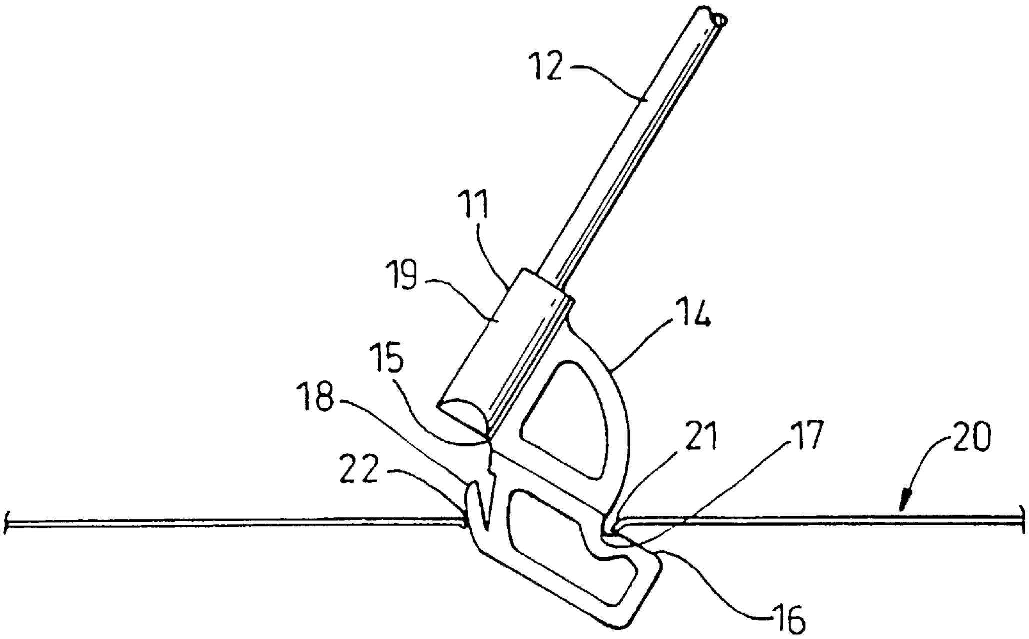
FIG. 3 is a view similar to that of FIG. 1 but showing only part of the support at a first stage of assembly of the support to the motor vehicle.

To assemble the support to the motor vehicle the stop 16 is first inserted into the aperture in the structural member 20 so that it takes up a position similar to that shown in FIG. 3. Rotation of the support 10 in an anti-clockwise direction from the position as shown in FIG. 3 will bring the lug 18 into abutment with one edge 22 of the aperture and the recess 17 into contact with the opposite edge 21 of the aperture. Further movement in an anti-clockwise direction will result in the plastic hinge member 11 undergoing a small amount of plastic deformation as the lug 18 is forced by the edge 22 of the aperture in the structural member 20 to take up the position as shown in FIG. 4.

Figure 4:
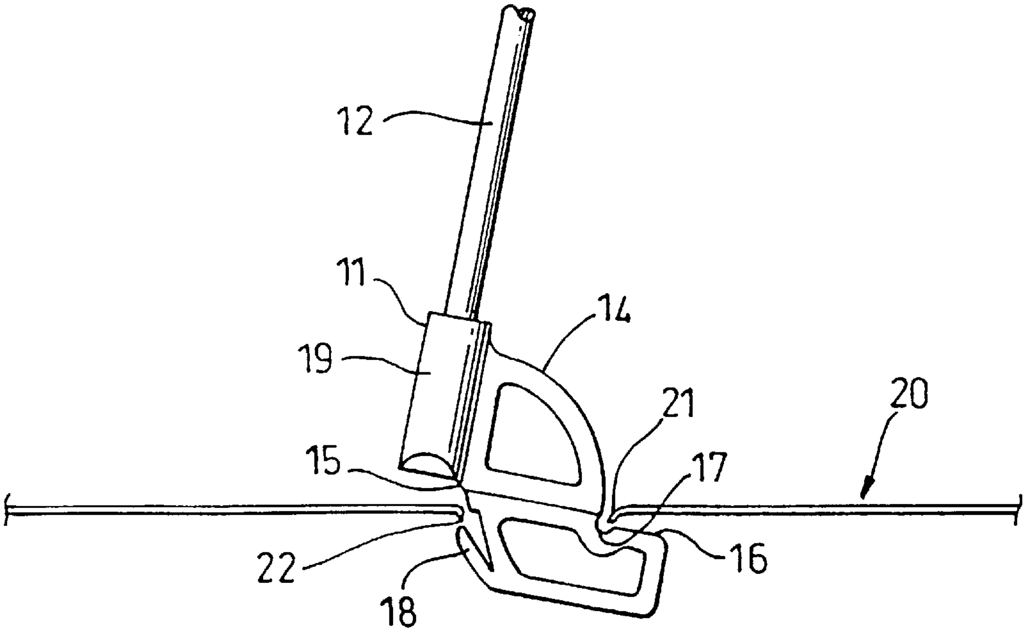
FIG. 4 is a view similar to that shown in FIG. 3 but showing the support at a second stage during its assembly to the motor vehicle.
Figure 5:
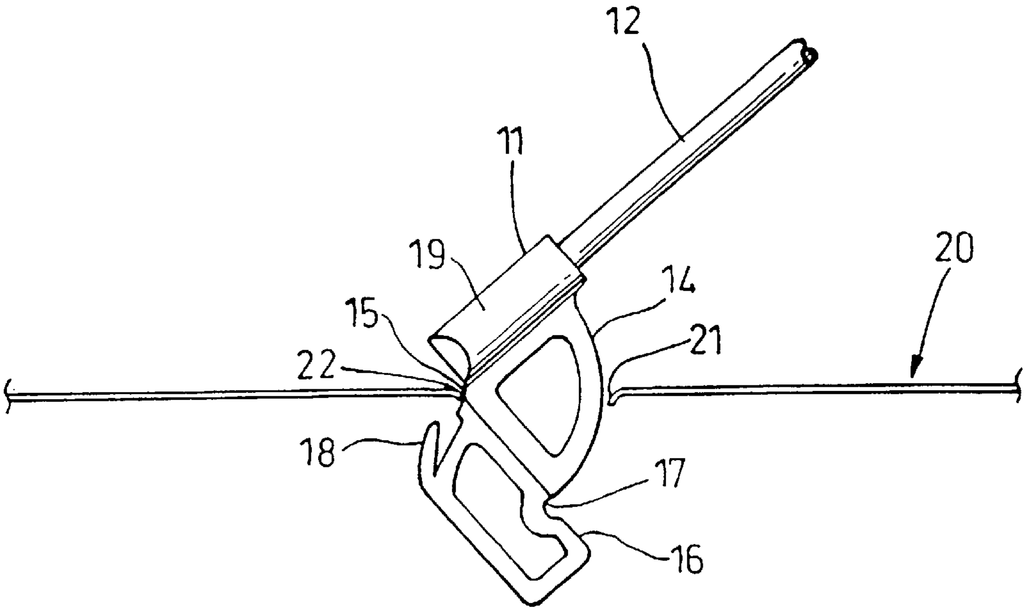
FIG. 5 is a view similar to FIG. 3 but showing the support in an, in use, position in which it is supporting an open engine cover of the motor vehicle.

Rotation of the support 10 in a clockwise position from that shown in FIG. 4 will move it into a normal bonnet supporting position as shown in FIG. 5. In this position one edge 22 of the aperture is in abutment with the pivot surface 15 and there is a small gap between the curved guide surface 14 and the opposite edge 21 of the aperture.

Figure 6:
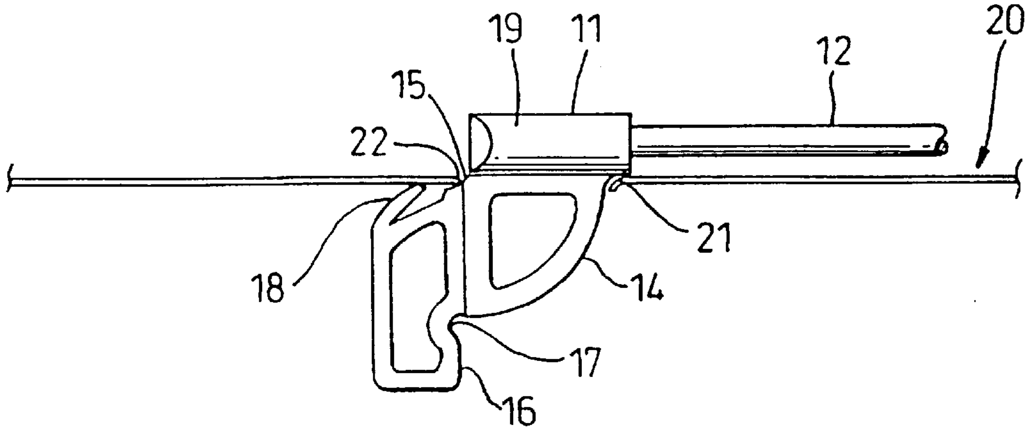
FIG. 6 is a view similar to FIG. 3 but showing the support in a stored or non-use position.

By disengaging the top end fixing 13 from the aperture in the bonnet and rotating the support 10 in a clockwise direction from that in shown in FIG. 5 it will be moved to a stored position as shown in FIG. 6.

It will be appreciated that once the plastic hinge member has been forcibly engaged with the aperture in the structural member 20 it cannot be easily disengaged and during normal operation on the support 10 there is no possibility of the plastic hinge member becoming accidentally disengaged from the aperture 20.

The invention therefore provides a simple and convenient way of attaching a support for the bonnet of a motor vehicle to a horizontally extending surface formed by a structural member of the motor vehicle without the need for additional fixings and in a simple and cost effective manner.

What is claimed is:

1. A motor vehicle having a body including a cross-member, an engine cover supported by the body and pivotable between a closed position and an open position, and a support for the cover in which the support for the cover comprises an elongate rod having a base end engaged with the cross-member of the motor vehicle and a top end for engagement with the cover when the support is in a cover supporting position;

wherein the base end has a plastic hinge member partially received within an aperture formed in a top surface of the cross-member of the motor vehicle to allow the support to be folded from a stored position to the cover supporting position and the plastic hinge member has a surface which abuts against an inwardly facing edge of the aperture when the support is moved relative to the aperture.

2. A motor vehicle as claimed in claim 1 in which the top surface of the cross-member is a horizontal surface.

3. A motor vehicle having a body including a cross-member, an engine cover supported by the body and pivotable between a closed position and an open position, and a support for the cover in which the support for the cover comprises an elongate rod having a base end engaged with the cross-member of the motor vehicle and a top end for engagement with the cover when the support is in a cover supporting position;

wherein the base end has a plastic hinge member comprising: a flange portion plastically deformable to enter and be retained within an aperture formed in a top surface of the cross-member of the motor vehicle, and a tubular body portion supporting the cover which does not enter the aperture; to allow the support to be folded from a stored position to the cover supporting position, and the plastic hinge member has a pivot surface for abutment against one edge of the aperture and a curved guide surface for abutment with an opposite edge of the aperture.

4. A motor vehicle having a body including a cross-member, an engine cover supported by the body and pivotable between a closed position and an open position, and a support for the cover in which the support for the cover comprises an elongate rod having a base end engaged with the cross-member of the motor vehicle and a top end for engagement with the cover when the support is in a cover supporting position;

wherein the base end has a plastic hinge member comprising: a flange portion plastically deformable to enter and be retained within an aperture formed in a top surface of the cross-member of the motor vehicle, and a tubular body portion supporting the cover which does not enter the aperture; to allow the support to be folded from a stored position to the cover supporting position, and the top surface of the cross-member is a horizontal surface and the plastic hinge member has a pivot surface for abutment against one edge of the aperture and a curved guide surface for abutment with an opposite edge of the aperture.

5. A motor vehicle as claimed in claim 1 in which the plastic hinge member has a pivot surface for abutment against one edge of the aperture and a curved guide surface for abutment with an opposite edge of the aperture and a radial distance between the pivot surface and the guide surface is slightly less than a distance between the opposite edges of the aperture.

6. A motor vehicle as claimed in claim 1 in which the top space of the cross-member is a horizontal surface, the plastic hinge member has a pivot surface for abutment against one edge of the aperture and a curved guide surface for abutment with an opposite edge of the aperture and a radial distance between the pivot surface and the guide surface is slightly less than a distance between the opposite edges of the aperture.

7. A motor vehicle as claimed in claim 1 in which the top surface of the cross-member is a horizontal surface and the plastic hinge member has a stop formed at one end of the curved guide surface to limit rotation of the plastic hinge member in one direction.

8. A motor vehicle as claimed in claim 1 in which the plastic hinge member has a pivot surface for abutment against one edge of the aperture and a curved guide surface for abutment with an opposite edge of the aperture and the plastic hinge member has a stop formed at one end of the curved guide surface to limit rotation of the plastic hinge member in one direction.

9. A motor vehicle as claimed in claim 1 in which the top surface of the cross-member is a horizontal surface, the plastic hinge member has a pivot surface for abutment against one edge of the aperture and a curved guide surface for abutment with an opposite edge of the aperture and the plastic hing member has a stop formed at one end of the curved guide surface to limit rotation of the plastic hinge member in one direction.

10. A motor vehicle as claimed in claim 1 in which the top surface of the cross-member is a horizontal surface, the plastic hinge member has a stop formed at one end of a curved guide surface to limit rotation of the plastic hinge member in one direction, and there is a recess between the end of the curved guide surface and the stop such that a distance between the surface of the recess and the pivot surface is considerably less than a distance between opposed edges of the aperture.

11. A motor vehicle as claimed in claim 1 in which the plastic hinge member has a pivot surface for abutment against one edge of the aperture and a curved guide surface for abutment with an opposite edge of the aperture, the plastic hinge member has a stop formed at one end of the curved guide surface to limit rotation of the plastic hinge member in one direction and a recess between the end of the curved guide surface and the stop such that a distance between the surface of the recess and the pivot surface is considerably less than a distance between the opposite edges of the aperture.

12. A motor vehicle as claimed in claim 1 in which the top surface of the cross-member is a horizontal surface, the plastic hinge member has a pivot surface for abutment against one edge of the aperture and a curved guide surface for abutment with an opposite edge of the aperture, the plastic hinge member has a stop formed at one end of the curved guide surface to limit rotation of the plastic hinge member in one direction and there is a recess between the end of the curved guide surface and the stop such that a distance between the surface of the recess and the pivot surface is considerably less than a distance between the opposite edges of the aperture.

13. A motor vehicle as claimed in claim 1 in which the top surface of the cross-member is a horizontal surface, the plastic hinge member has a stop formed at one end of the curved guide surface to limit rotation of the plastic hinge member in one direction, a recess between the end of the curved guide surface and the stop is such that a distance between the surface of the recess and the pivot surface is considerably less than a distance between opposed edges of the aperture and there is a lug formed on the surface of the plastic hinge member adjacent the pivot surface.

14. A motor vehicle as claimed in claim 1 in which the plastic hinge member has a pivot surface for abutment against one edge of the aperture and a curved guide surface for abutment with an opposite edge of the aperture, the plastic hinge member has a stop formed at one end of the curved guide surface to limit rotation of the plastic hinge member in one direction, a recess between the end of the curved guide surface and the stop is such that a distance between the surface of the recess and the pivot surface is considerably less than a distance between the opposite edges of the aperture and there is a lug formed on the surface of the plastic hinge member adjacent the pivot surface.

15. A motor vehicle as claimed in claim 1 in which the top surface of the cross-member is a horizontal surface, the plastic hinge member has a pivot surface for abutment against one edge of the aperture and a curved guide surface for abutment with an opposite edge of the aperture, the plastic hinge member has as top formed at one end of the curved guide surface to limit rotation of the plastic hinge member in one direction, a recess between the end of the curved guide surface and the stop is such that a distance between the surface of the recess and the pivot surface is considerably less than a distance between the opposite edges of the aperture and there is a lug formed in the surface of the plastic hinge member adjacent the pivot surface.

16. A motor vehicle as claimed in claim 1 in which the top surface of the cross-member is a horizontal surface, the plastic hinge member has a stop formed at one end of the curved guide surface to limit rotation of the plastic hinge member in one direction, a recess between the end of the curved guide surface and the stop is such that a distance between the surface of the recess and the pivot surface is considerably less than a distance between the edges of the aperture, a lug is formed on the surface of the plastic hinge member adjacent the pivot surface and the distance from the top surface of the lug to the surface of the recess is greater than the distance between the opposite edges of the aperture such that the plastic hinge member has to be snap-fitted into the aperture.

17. A motor vehicle as claimed in claim 1 in which the plastic hinge member has a pivot surface for abutment against one edge of the aperture and a curved guide surface for abutment with an opposite edge of the aperture, the plastic hinge member has a stop formed at one end of the curved guide surface to limit rotation of the plastic hinge member in one direction, a recess between the end of the curved guide surface and the stop is such that a distance between the surface of the recess and the pivot surface is considerably less than a distance between the opposite edges of the aperture, a lug is formed on the surface of the plastic hinge member adjacent the pivot surface and the distance from the top surface of the lug to the surface of the recess is greater than the distance between the opposite edges of the aperture such that the plastic hinge member has to be snap-fitted into the aperture.

18. A motor vehicle as claimed in claim 1 which the top surface of the cross-member is a horizontal surface, the plastic hinge member has a pivot surface for abutment against one edge of the aperture and a curved guide surface for abutment with an opposite edge of the aperture, the plastic hinge member has a stop formed at one end of the curved guide surface to limit rotation of the plastic hinge member in one direction, a recess between the end of the curved guide surface and the stop is such that a distance between the surface of the recess and the pivot surface is considerably less than a distance between the opposite edges of the aperture, a lug is formed on the surface of the plastic hinge member adjacent the pivot surface and a distance from the top surface of the lug to the surface of the recess is greater than a distance between the opposite edges of the aperture such that the plastic hinge member has to be snap-fitted into the aperture.

* * * * *